United States Patent
Tarulli

Patent Number: 5,992,807
Date of Patent: Nov. 30, 1999

[54] UNIVERSAL MAGNETIC STAND FOR CELL PHONES

[75] Inventor: Dario Tarulli, Osimo, Italy

[73] Assignee: Intec - SRL, Italy

[21] Appl. No.: 08/874,874

[22] Filed: Jun. 13, 1997

[30] Foreign Application Priority Data

Jun. 13, 1997 [IT] Italy ................................ AN96A0024

[51] Int. Cl.⁶ ................................................. A47G 1/17
[52] U.S. Cl. .................................. 248/206.5; 248/309.4; 248/205.3; 379/454
[58] Field of Search ...................... 248/683, 632, 248/205.3, 309.4, 467, 206.5; 211/70.7; 40/600, 661.01, 651; 381/365, 87; 379/454, 446, 417, 419, 455; 224/562, 558, 553, 275

[56] References Cited

U.S. PATENT DOCUMENTS

| | | | |
|---|---|---|---|
| 2,966,992 | 1/1961 | Dunkelberger et al. | 211/70.7 |
| 3,195,022 | 7/1965 | Staver | 40/651 X |
| 3,552,705 | 1/1971 | Caster | 248/683 X |
| 3,642,122 | 2/1972 | Von Ende | 224/562 |
| 4,100,684 | 7/1978 | Berger | 206/818 X |
| 4,287,676 | 9/1981 | Weinhaus | 40/661.01 |
| 4,319,097 | 3/1982 | Liautaud | 179/146 R |
| 4,605,292 | 8/1986 | McIntosh | 248/205.3 X |
| 4,957,266 | 9/1990 | Ellis | 248/683 |
| 5,031,874 | 7/1991 | Shannon | 248/683 |
| 5,096,154 | 3/1992 | Ellis | 248/683 |
| 5,588,055 | 12/1996 | Williamson et al. | 379/446 |

FOREIGN PATENT DOCUMENTS

| | | |
|---|---|---|
| 93 01 423 U | of 0000 | Germany . |
| 07288570 | of 0000 | Japan . |
| 61161849 | of 0000 | Japan . |
| 2 241 132 | of 0000 | United Kingdom . |

*Primary Examiner*—Ramon O. Ramirez
*Assistant Examiner*—Gwendolyn Baxter
*Attorney, Agent, or Firm*—Leonard Bloom

[57] ABSTRACT

A cell phone is removably attached to the dashboard of a vehicle by means of a magnet. The magnet is permanently secured to the dashboard. The cell phone is removably retained by the magnet (due to the attraction between the magnet and the metal parts normally found in the cell phone) and the cell phone may be lifted off manually and manually replaced on the magnet. The magnet has a front face provided with a rubber layer. This rubber layer provides a frictional resistance which is supplementary to the magnet and prevents the cell phone from slipping down.

2 Claims, 1 Drawing Sheet

UNIVERSAL MAGNETIC STAND FOR CELL PHONES

This patent application concerns a magnetic stand for holding cell phones In a car or anywhere else.

The invention is designed to resolve an important problem for owners of cell phones.

People who have a cell phone and perhaps one or more cars, find themselves with the problem of requiring a stand which holds the phone in a set position without moving and causing damage to the phone or problems for the driver.

Various types of plastic phone stands today exist on the market which fix the phone by means of tabs holding the sides of the phone and allowing the phone to be inserted or removed from the stand by pressing the phone in thanks to the elasticity of the plastic or by means of a button which loosens the pressure of the tabs or hooks and thus allows the phone to be removed. The use of these stands does however involve a series of inconveniences such as having to make holes on the car dashboard in order to fix the same, which the owner is often reluctant to make.

Some of the stands currently available on the market (those whereby the phone is pressed into the stand) moreover have the added inconvenience of scratching the phone at the points where the stand touches the phone and which tend to become deep scratches which in no way affect the operation of the phone but in time force the owner to replace the damaged shell which in Itself is quite expensive.

These stands in addition may be used only for the cell phone model for which they are designed, making it impossible to reuse them if the owner changes the phone with a new make or model, which in recent times has become more and more frequent as a result of rapid developments in technology or even when a car is used by owners of different phone models or makes, which is again very frequent in view of the fact that these phones are today very widely used.

Moreover with the above stands the user must be very careful when inserting the phone in order to avoid dropping and damaging the appliance which is becoming more difficult to do considering the increasingly smaller dimensions of these phones.

Considering also that many cell phone owners get in and out of their cars frequently during the day, this operation of inserting and removing the cell phone is repeated continuously which is both inconvenient and time wasting.

The scope of this invention is to design a device which makes it possible to secure and remove cell phones of any make and model in a car or other vehicle or even on a wall, easily and quickly.

The instrument according to the invention consists of one or more magnets of suitable shape, dimensions and flow and preferably with good properties (e.g. neodymium powder magnet) which ensure, with an item of very compact dimensions corresponding to a 500£ coin, a perfect hold even in the case of strong mechanical vibrations and jolting which occur when a car is running.

Said magnet attracts the cell phone by means of its battery pack, securing it in the required position.

It is possible to achieve a strong attracting force in that the battery pack in cell phones consists of two main sections: an outer section corresponding to the plastic casing (generally black and fairly thin) and an inner section corresponding to the electric batteries which are generally nickel cadmium or hydrated metal nickel type batteries.

These batteries all have a metal casing (in ferromagnetic material) which is inevitably attracted by the magnet It is therefore sufficient to place the battery pack side of the phone (which is generally the back) against the magnetic stand to secure the phone firmly to the car dashboard.

The magnet is provided on one side with a strong biadhesive tape which attaches the same securely to the car dashboard and on the other side with a thin layer of rubber or other suitable material which prevents the phone from slipping down due to the force of gravity, once It is positioned vertically. During use, the magnetic flow of the device stops in the metal part of the battery pack and consequently out of the electronic circuits in the phone; moreover the phone shielding prevents this flow from entering the circuits, consequently preventing any interference.

The advantages of the stand in question are obvious: not only is the same a simple and inexpensive device but it is also extremely practical and simple to use.

It is moreover very versatile since the stand in question is compatible to almost any cell phone model.

For major clarity the description of the invention continues with reference to the enclosed drawings which are intended for purposes of illustration and not in a limiting sense, where:

With reference to the enclosed drawings, the device consists of a magnet (1) having suitable shape and flow and a thin layer of rubber (3) or other material with similar characteristics to prevent the phone from sliding downwards as well as a tape of strong biadhesive material (2) which allows the magnet to adhere to the car dashboard.

Figure 2:
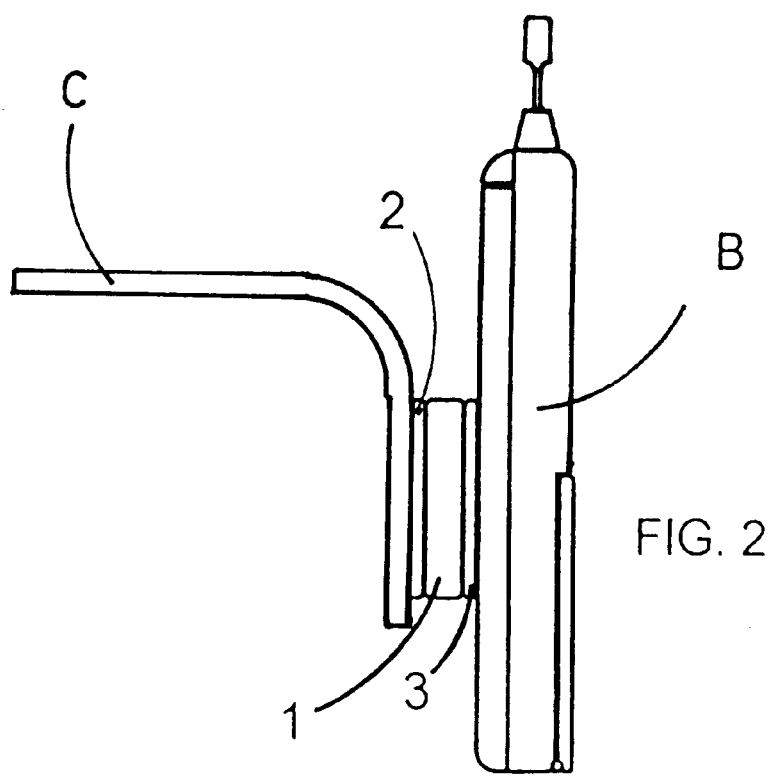
FIG. 2 (by way of example) is a side view of the device (1,2,3) mounted on a car dashboard (C) with the cell phone (B) attached.

FIG. 2 shows the stand on the dashboard (C) of a car with the cell phone (B) secured in the ideal position.

Figure 1:
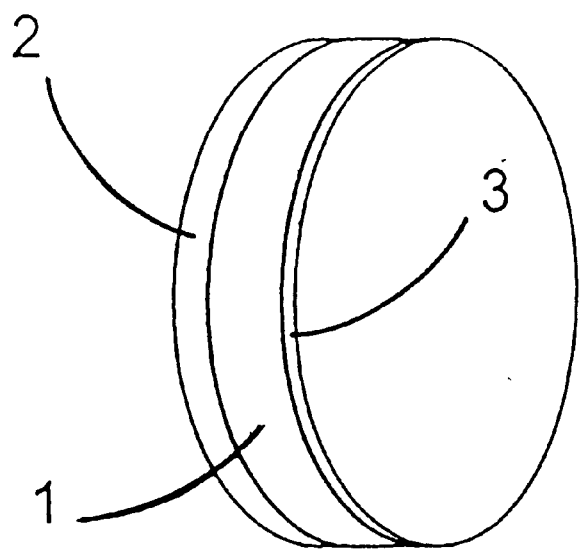
FIG. 1 is an axonometric view of the magnet according to the invention.

As mentioned previously, the shape of the device shown in the drawings (FIG. 2), (FIG. 1) is purely for purposes of illustration and not intended in a limiting sense as far as its characteristics are concerned.

I claim:

1. In combination with a cell phone and the interior vertical surface of a vehicle, a universal magnetic stand for removably attaching the cell phone to the surface of the vehicle, comprising a magnet permanently secured to the surface, such that the cell phone is removably retained by the magnet, and such that the cell phone may be lifted off manually and manually replaced on the magnet, and the magnet having a front face provided with a rubber layer, such that the rubber layer on the front face of the magnet provides a frictional resistance which is supplementary to the magnet and prevents the cell phone from slipping down.

2. The combination of claim 1, wherein the interior vertical surface of the vehicle comprises a dashboard.

* * * * *